United States Patent [19]

Egli et al.

[11] 4,235,934

[45] Nov. 25, 1980

[54] PRODUCTION OF STERILE YOGHURT

[75] Inventors: Franz Egli; Franz Egli, both of Lucerne, Switzerland

[73] Assignee: Zentralschweizerischer Milchverbrand, Lucerne, Switzerland

[21] Appl. No.: 968,838

[22] Filed: Dec. 12, 1978

Related U.S. Application Data

[63] Continuation of Ser. No. 858,290, Dec. 7, 1977, abandoned.

[51] Int. Cl.³ .............................................. A23C 9/12
[52] U.S. Cl. ...................................... 426/43; 426/522
[58] Field of Search ................... 426/34, 42, 43, 583, 426/522

[56] References Cited

U.S. PATENT DOCUMENTS 3,932,680   1/1976   Egli et al. ............................... 426/43

OTHER PUBLICATIONS

Webb, et al., Byproducts from Milk, 2nd ed., The Avi Publ. Co. Inc., Westport, Conn., 1970, p. 39.

*Primary Examiner*—David M. Naff
*Attorney, Agent, or Firm*—Sixbey, Friedman & Leedom

[57] ABSTRACT

Sterile, shelf stable yoghurt capable of unrefrigerated storage without degradation for six months or more is prepared by forming a mixture containing pasteurized and homogenized milk and a modifying additive consisting essentially of red algae, starch, gelatin and sugar, adding a culture to the mixture, incubating the mixture to produce yoghurt, cooling the yoghurt, adding hydrocolloid containing stabilizers to the yoghurt and swelling the stabilizers, filling the yoghurt into containers and hermetically sealing the containers, heat sterilizing the filled containers and cooling the sterilized containers.

16 Claims, No Drawings

PRODUCTION OF STERILE YOGHURT

This is a continuation of application Ser. No. 858,290, filed Dec. 7, 1977, now abandoned.

BACKGROUND OF THE INVENTION

1. Field of the Invention

The present invention relates to a method for making yoghurt and, more particularly, to a method for preparing sterile yoghurt which is capable of stable storage for six months without refrigeration.

2. Description of the Prior Art

It is generally well known that yoghurt is a product formed from milk which has been heated, cultured with a yoghurt culture such as *Lactobacillus bulgaricus* and *Streptococcus thermophilus*, incubated at about 40°–45° C. for a time sufficient to reach an acidic pH of 3.5 to 5.0, refrigerated to stop the growth of microorganisms, and then packaged for sale. Depending upon the consistency and flavor desired, various sweetners, stabilizers, fruits or other aromatic substances have been added to the yoghurt product prior to packaging. However, yoghurt produced according to conventional processes requires refrigeration during storage and/or transportation until immediately prior to consumption to prevent the growth of bacteria and/or the formation of mildew or other decomposition products.

In order to overcome the logistical inconvenience and expense incident to continuous refrigeration up until consumption, it has been an object of yoghurt manufacturers to prepare, if possible, a sterile form of the product which is not subject to deterioration in so rapid a manner as is characteristic of the conventionally prepared product. U.S. Pat. No. 3,932,680 assigned to the same assignee as the present invention suggests one way of achieving this result. According to the yoghurt preparation process taught in that patent, a sterile yoghurt can be prepared as follows:

(a) pasteurizing milk at a temperature of at least 90° C. and homogenizing the milk;

(b) concentrating the pasteurized and homogenized milk by 10% by weight at a temperature of about 92° C.;

(c) adding 10%–12% by weight sugar to the concentrated milk;

(d) cooling the sugar-containing milk to about 40° C.;

(e) adding lactic acid bacterial cultures and incubating to pH 4–4.3 over 2½-hours at 42°–44° C.;

(f) cooling the acidified milk (yoghurt) to 20°–30° C.;

(g) cooling the yoghurt to 4°–12° C.;

(h) adding an effective amount of a stabilizer A containing, by weight, 20–30% emulsifier, 30–40% carageen, 30–40% carboxymethylcellulose, 2–3% carob-bean meal or powder and 4–8% guar meal or powder;

(i) adding an effective amount of a stabilizer B which is potato or other starch;

(j) adding an effective amount of a stabilizer C containing, by weight, 75–85% pure modified plant starch and 15–25% of 60% modified gelatin and sucrose wherein the sucrose is the carrier;

(k) permitting the resulting mass to stand at 4°–12° C. for 5–7 hours;

(l) filling the mass into packages and hermetically sealing same;

(m) sterilizing the packages in an autoclave at temperatures in the range 60°–85° C. and at a pressure up to 2 atmospheres for a time sufficient to sterilize;

(n) cooling the packages under pressure to 10°–15° C.;

(o) storing the cooled packages for 2–4 days at 4°–6° C.; and (p) storing the packages at room temperature.

Although good results have been obtained using the foregoing method of U.S. Pat. No. 3,932,680 it is now believed that a still better sterile yoghurt product having improved shelf stability can be prepared.

SUMMARY OF THE INVENTION

It is, therefore, an object of the present invention to provide a method for preparing yoghurt which retains its taste and consistency and which is capable of prolonged storage without bacterial or other degradation for at least six months without refrigeration.

It is another object of the invention to prepare a stable, sterile yoghurt which is free of preservatives and in which whey separation does not occur.

It is still another object of the invention to provide a method for preparing yoghurt which, in terms of shelf stability and sterility, is an improvement over the yoghurt prepared by the method of our U.S. Pat. No. 3,932,680.

Other objects and advantages will become apparent from the following description and appended claims.

Briefly stated, in accordance with the aforesaid objects, the present invention provides a process for producing a yoghurt having a stable consistency and taste and which is sufficiently free of micro-organisms to exhibit an unrefrigerated shelf life of six months or more without degradation, decomposition and mildew. In general, this improved process is achieved by modifying milk, before or after it is pasteurized and homogenized, with an additive consisting essentially of red algae, starch, gelatin and sugar (for standardization purposes), prior to more or less conventionally preparing the yoghurt product by innoculating the modified milk with a yoghurt culture, incubating for a time sufficient to achieve a pH of about 3.8 to 4.6, cooling the cultured milk to stop the incubating process, adjusting the consistency of the yoghurt by addition of stabilizers and by appropriate cooling, filling the resulting mass into appropriate containers and sterilizing under conditions and for a time sufficient to destroy the micro-organisms present. During the course of the yoghurt preparation, the milk product may be concentrated, sweetened or otherwise adjusted in taste or viscosity to produce an end product having the desired taste, mouth feel, appearance and consistency. If desired, the yoghurt product may be admixed with fruit to produce a fruit-containing sterile yoghurt. However, irrespective of whether or how the yoghurt product is adjusted for aesthetic improvement, the outstanding shelf stability and sterility of the yoghurt product of the present invention is achieved only by appropriate modification of the milk prior to culturing and by adherence to the essential processing steps and parameters described herein.

DETAILED DESCRIPTION OF THE INVENTION

The shelf stable, sterilized yoghurt of the present invention may be prepared from milk having a fat content ranging anywhere between full cream and skim with or without added dry milk products, although generally full cream and milk standardized to a content of 3.5% fat by weight is used. Depending upon the consistency sought in the final yoghurt product, prior to innoculation and incubation, the milk viscosity may be adjusted by concentrating the milk by 5 to 20% by weight, preferably 8-18% and most desirably by 10-12%. This may be achieved by addition of dry milk solids, by evaporation, by a combination of these methods, or by any other suitable technique. Generally, however, viscosity is increased without altering flavor or consistency by evaporation under partial vacuum at temperatures in the range 85°-98° C. Vacuum evaporation equipment suitable for achieving this result is well known and commercially available. If desired, milk powder, such as skim milk powder, in quantities from 0 to 4% by weight, preferably about 2% by weight, may also be utilized. It is generally recognized that thickening or concentrating of the starting raw milk in this manner reduces the liquidity and improves the tast and aesthetic appeal of the final yoghurt product.

Notwithstanding that the raw milk may be concentrated it has been found that in order to produce a product having consistently stable long life and sterility it is necessary to add to the milk, prior to culturing, a milk modifying substance which will maintain the solid consistency of the yoghurt and prevent its turning to liquid over the long unrefrigerated storage periods it experiences. To this end it is recommended to mix the raw milk with from 0.18 to 0.4% by weight, most usually 0.18 to 0.22%, and preferably about 0.2%, of a modifying additive consisting essentially of red algae (agar) starch, gelatin and sugar. The red algae is the predominant ingredient in terms of quantity. The remaining ingredients, in order of decreasing concentration are starch, gelatin and sugar, the latter being present for standardization purposes. The modifying additive may advantageously be included in the milk by forming an additive concentrate consisting primarily of raw milk, skim milk powder and the additive substance and admixing the concentrate with the balance of the milk to be processed to yoghurt.

The starting material raw milk must also be pasteurized and homogenized, in any convenient sequence, prior to culturing. Inasmuch as these are standardized procedures, they will not be dealt with here in detail. However, in the preferred case, where the additive modified milk is concentrated by evaporation, it is generally most convenient, although not required, to dehydrate the milk by evaporation, pasteurize and homogenize in a manner which avoids repeated heating and cooling. One way of achieving this is by introducing the raw milk to be processed into a plate pasteurizer wherein the milk modifying substance is added and the mixture is heated in stages up to about 95° C., transferring the pasteurized milk to an evaporator installation maintained at about 0.8 atmosphere to remove about 10% of the water therefrom, and then homogenizing the dehydrated, pasteurized milk at about 93°-94° C. and an elevated pressure of about 180 atm. It will be appreciated that these conditions are merely exemplary and that pasteurization, whether vat or continuous flow, and homogenization can be achieved at any appropriate temperature between about 65° C. and 150° C., at suitable pressures and for suitable times consistent with conventional practice and applicable laws and regulations.

In the preparation of yoghurt products the milk is frequently sweetened to adjust the taste of the product by adding artificial sweeteners, e.g., sugar, prior to innoculation. If such sweetening is desired, sugar may, for example, advantageously be added to the already warm concentrated milk solution from the prior steps (still at about 75°-90° C.), in quantities constituting 8-12% by weight, preferably 10-12% by weight, of the solution. The sugar rapidly dissolves at these temperatures to influence the taste, but not the shelf stability or sterility, of the desired yoghurt product.

The milk solution, concentrated and/or sweetened as desired to produce an aesthetically pleasing end product, is next cultured in an incubation tank at temperatures in the range 35°-45° C., preferably 40°-45° C. The milk solution is innoculated with 1.5 to 4.0% by weight, preferably 2.5-3.5%, of a yoghurt culture preferably consisting of conventional yoghurt starter micro-organisms such as *Lactobacillus bulgaricus* and *Streptococcus thermophilus*. The innoculated milk is stirred well for about 15 minutes and then permitted to incubate for the time necessary, generally 3-8 hours, but usually 2½ to 4 hours, for the solution to reach a pH in the range 3.8 to 4.6, preferably 4.0-4.4, and most desirably 4.3-4.4. For best results, the temperature of the incubating solution is controlled to about 43°-44° C. When incubation has proceeded far enough as indicated by solution pH, the coagulum is pumped off, e.g., using a membrane pump, and is refrigerated to 20°-30° C., preferably about 26° C., to stop the microbiological action of the culture.

In conventional manner, the cultured yoghurt may be stabilized for viscosity control, particularly since such stabilization is called for by the sterilization step to follow. The stabilizers are generally selected from the well-known hydrocolloid-containing substances such as are exemplified in U.S. Pat. No. 3,932,680 and U.S. Pat. No. 3,539,363. These substances include, but are not limited to, locust bean gum, guar gum, gum karaya, starch meal or powder, enriched starches, carageenan, alginic acid as well as sodium-, ammonium-, and calcium-compounds thereof, fruit pectin, pectic acid, agar-agar, guar meal or flour, carob bean meal or flour, carboxymethylcellulose, and the like. The specific combination of stabilizers and the quantities in which each is employed depends to a large extent on the composition of the milk solution, the additives thereto and the characteristics desired in the final yoghurt product.

The stabilizers, when added, are preferably dispersed in sterilized water and then thoroughly admixed with the cultured yoghurt. Desirably, stabilizer additions are made while the yoghurt is cooled to the temperature range 20°-30° C. It makes relatively little difference how the stabilizers are added. However, it has been generally recognized that mixtures of stabilizers can be tailored to prevent off-flavor and to achieve particularly desirable results. Therefore, the stabilizers are generally added in one or more groups, with each group containing one or more stabilizing substances. Generally, the total amount of stabilizer added varies between 0.25% and 2.0% by weight of the cultured yoghurt although, more frequently, an effective amount of stabilizer is in the range 0.5 to 1.0% by weight. The most suitable proportions for each substance and/or group of substances is most readily determined by test runs conducted on the yoghurt mass to be stabilized.

The following are illustrative groups of stabilizing substances found to be effective in controlling viscosity and off-flavors:

STABILIZER A 20-30% by weight emulsifier (GMS-33 glycerin monostearate)

30-40% by weight carageenan (Satiagel HV ex rot 5270)

30-40% by weight carboxymethylcellulose (AKU-CMC 4 F 850)

2-3% by weight carob-bean meal or powder (Polygum 14 T)

4-8% by weight guar meal or powder (Polygum 26 N)

STABILIZER B

Potato Starch

STABILIZER C 75-85% by weight SuCrest YO-72 (pure modified plant starch)

15-25% by weight SuCrest YO-100 (60 percent modified gelatin and sucrose wherein the sucrose is the carrier)

When the foregoing three stabilizers are used, they may be added separately, two at one time and one later, or all together.

If the yoghurt is to include fresh fruit or flavorings, these are added to the stabilized yoghurt mass following addition of the stabilizers. Exemplary of the fruits or flavorants which are typically employed are cherries, mandarines, peach/raspberries, raspberries and hazelnuts, although others may also be suitable. It is important that the yoghurt pH following stabilizer addition and/or following fruit addition remains in the range 4.0-4.4, preferably 4.3-4.4. Minor pH adjustments, limited to not more than about 0.1 pH unit, may be made in conventional manner, for example, by addition of disodium phosphate and sodium citrate. In addition, small quantities of sugar may be added for further taste and acidity adjustment. However, it is not desirable to add large quantities of sweeteners at this point in the process.

The stabilizers which have been added to the yoghurt should be afforded an opportunity to swell in order to improve the aesthetic appeal of the yoghurt product from the standpoints of consistency and mouth feel. Thus, it is recommended to cool the stabilizer-containing yoghurt product to 4° to 20° C. for a period of up to about 48 hours. The temperature and time are both factors in developing the desired mouth feel and consistency. For this reason, temperatures of 4°-12° C. and times of from 24 to 48 hours are preferred.

The cooled yoghurt may be filled into containers, hermetically sealed and sterilized. Preferably, filling occurs at these same low temperatures of 4°-20° C., preferably 4°-12° C. The containers used may, for instance, be formed of tin plate or aluminum which have been internally provided with a protective coating or lacquer. Alternatively, the containers may be formed of a plastic, such as polypropylene.

Heat sterilization of the hermetically sealed containers is a conventional procedure and may be accomplished by any known suitable technique, subject only to the restrictions that boiling of the yoghurt is to be avoided, container damage is not to occur, and at least the minimum temperatures required by applicable law are to be utilized. One exemplary sterilization technique, taught in U.S. Pat. No. 3,932,680, and incorporated herein by reference, involves sterilizing in an autoclave for up to about 50 minutes using hot water at temperatures from 60° up to 85° C. and pressures up to 2 atm. followed by cooling to 10°-15° C. under pressure in the autoclave. Although sterilization can be achieved in accordance with this invention by any suitable procedure, this particular sterilization technique has been found to provide an aesthetically pleasing, as well as sterile, yoghurt product which is characterized by an absence of the "fish-eyes" typically formed during heating in sealed containers.

The sterilized yoghurt product should be cooled to increase its firmness and, to that end, the sterilized containers may be refrigerated at about 4°-6° C. for at least 24 hours or for as many as a few days, e.g., 2 to 4 days, depending upon just how firm a product is desired. The firmness is a matter of aesthetics and product acceptability rather than shelf stability or sterility and, therefore, the cooling time is a matter of manufacturer's preference.

The degree of bacteriological sterility achieved by the process of the present invention can be checked by post-sterilization sample control. Inasmuch as the existence of a satisfactory product is related to the absence of yeast and mold as well as spores (clostridium), no such germs or spores should be detectable in samples stored as follows:

(a) 10-15 days at 30°-37° C.;
(b) 5 days at 50° C.;
(c) 90 days at 20°-30° C.;
(d) 120 days at 15°-25° C.;
(e) 240 days at 4° C.;

The following Example illustrates the practice of the present invention to form a shelf stable, sterile, aesthetically pleasing and commercially attractive yoghurt product.

EXAMPLE

A base quantity of 3.5% fat-containing processing milk is filled into a plate pasteurizer. A milk modifying additive concentrate is separately prepared containing: (1) a milk modifying additive consisting of red algae, starch, gelatin and sugar; (2) skim milk powder; and (3) standardized 3.5% fat milk. The additive is present in the concentrate in an amount equal to 0.2% by weight of the base quantity of processing milk; the standardized milk represents about 88% by weight of the concentrate; and the skim milk powder represents about 10% by weight of the concentrate. Care is taken to see that the skim milk powder and the modifying additive are homogeneously dispersed in the milk of the concentrate, e.g., by using agitation and heat up to about 40° C.

While the milk in the plate pasteurizer is heated up to about 70° C., the concentrate is mixed therewith and an additional quantity of skim milk powder, making a total of about 2% by weight of the base milk quantity, is added. The mixture is pasteurized at 95° C., transferred to an evaporator installation maintained at about 0.8 atm where about 10% of the water in the processing milk is evaporated, and then homogenized at 93°-94° C. and about 180 atm. About 10.5% sugar based on the concentrated milk is added to the processing milk and the resulting milk solution is transferred to an incubation tank maintained at about 43° C. The solution is innoculated with 2.5% by weight of a yoghurt culture and permitted to incubate for 3½-4 hours to reach a pH of 4.4. The coagulum is pumped off and cooled to 26° C. to stop the incubation.

Stabilizers are added to the cultured milk at 26° C. by dissolving about 0.2% by weight of stabilizer A (previously disclosed herein) and about 0.3% by weight of a 2:1 by weight mixture of stabilizers B and C (previously disclosed) in sterilized water and then stirring the stabilizers intensively into the yoghurt. At the same time, about 1% by weight of sugar and an effective amount of raspberry fruit, flavoring and dyes are added. The resulting fruit flavored yoghurt pH was confirmed to be 4.4.

The fruit flavored and stabilized yoghurt was cooled to 4°-6° C. for 24-48 hours to permit the stabilizers to swell. Thereafter the yoghurt mass was hermetically filled into containers formed of aluminum and having an inner lacquer coating and the containers were placed in a hot water autoclave for sterilization. Temperature and pressure in the autoclave were controlled to 80° C. and 1.6 atm. for 10 minutes and increased to 84° C. and 1.8 atm. for 12 minutes. Thereafter, the temperature was decreased gradually over 20-25 minutes to 15° C. while the pressure was initially maintained and then gradually reduced to ambient. Following sterilization the yoghurt containers were cooled to 4° C., for 24 hours to improve yoghurt consistency and to form an aesthetically pleasing product. The resulting yoghurt product is a bit gritty and, prior to using, the yoghurt container should be shaken to enhance the creaminess of the product.

While the present invention has been described with reference to particular embodiments thereof, it will be understood by those skilled in the art that numerous modifications can be made without actually departing from the scope of the invention. Accordingly, all modifications and equivalents may be resorted to which fall within the scope of the invention as claimed.

We claim:

1. A method for the production of shelf stable and sterile yoghurt comprising the steps of:
   (a) admixing a solution comprising pasteurized and homogenized milk and from 0.18 to 0.4% by weight of said milk of a milk modifying additive consisting essentially of red algae, starch, gelatin and sugar, wherein the red algae is present in the highest concentration, with from 1.5 to 4% by weight of said milk of a yoghurt culture;
   (b) incubating the mixture at temperatures in the range 35° to 45° C. until the solution reaches a pH in the range 3.8 to 4.6 to form yoghurt;
   (c) cooling the yoghurt to 20° to 30° C.;
   (d) admixing an effective amount to control viscosity of hydrocolloid-containing stabilizers with the cooled yoghurt;
   (e) swelling the stabilizers to enhance the consistency of the yoghurt;
   (f) filling the yoghurt into containers and hermetically sealing the filled containers;
   (g) heat sterilizing the filled containers at elevated temperatures and pressures for a time sufficient to sterilize; and
   (h) cooling the sterilized containers at 4° to 6° C. for at least 24 hours.

2. A method, as claimed in claim 1, wherein said solution comprises 0.18 to 0.22% by weight of said milk modifying additive.

3. A method, as claimed in claim 1, including the step of concentrating said solution by 5 to 20% by weight prior to admixture with said culture.

4. A method, as claimed in claim 3, wherein said concentrating step comprises evaporating said milk at temperatures in the range 85°-98° C. under partial vacuum.

5. A method, as claimed in claim 1, including the step of adding up to 4% by weight of dry milk powder to said solution prior to admixture with said culture.

6. A method, as claimed in claim 1, including the step of adding from 8 to 12% by weight sweeteners to said solution prior to admixture with said culture.

7. A method as claimed in claim 1, wherein said solution is admixed with from 2.5 to 3.5% by weight of said yoghurt culture.

8. A method, as claimed in claim 1, wherein said solution is incubated to a pH in the range 4.0-4.4.

9. A method, as claimed in claim 1, wherein said stabilizers are swelled by cooling said stabilized yoghurt to a temperature in the range 4° to 20° C. for up to 48 hours.

10. A method, as claimed in claim 1, including the step of adding fruit to said stabilized yoghurt prior to swelling.

11. A method, as claimed in claim 10, wherein said yoghurt pH following fruit addition is maintained in the range 4.0 to 4.4.

12. A method, as claimed in claim 11, wherein said yoghurt pH is maintained in the range 4.3 to 4.4.

13. A method, as claimed in claim 1, wherein said heat sterilizing comprises heating said containers at temperatures up to about 85° C. at pressures up to about 2 atm.

14. A method, as claimed in claim 2, wherein said solution is concentrated 10-12% by weight by evaporation and sweetened by addition of 10-12% by weight of sugar prior to admixture with said culture; said solution is admixed with from 2.5 to 3.5% by weight of said yoghurt culture; said solution is incubated at 40°-45° C. until the solution reaches a pH in the range 4.0 to 4.4; said stabilizers are swelled by cooling said yoghurt to the range 4°-12° C. for 24 to 48 hours; and, said heat sterilizing comprises heating said containers to temperatures up to about 85° C. at pressures up to about 2 atm. and thereafter cooling said containers while maintaining said pressure for at least a portion of the cooling period.

15. A method, as claimed in claim 14, including the step of adding fruit to said stabilizer-containing yoghurt prior to swelling while maintaining the yoghurt pH in the range 4.0 to 4.4.

16. A method, as claimed in claim 2, wherein said hydrocolloid stabilizers comprise stabilizers A, B and C, as follows:

Stabilizer A
   20-30% by weight emulsifier
   30-40% by weight carageenan
   30-40% by weight carboxymethylcellulose
   2-3% by weight carob-bean meal or powder
   4-8% by weight guar meal or powder
Stabilizer B
   Potato Starch
Stabilizer C
   75-85% by weight pure modified plant starch
   15-25% by weight of 60% modified gelatin and sucrose wherein the sucrose is the carrier.

* * * * *